(12) United States Patent
Wilson et al.

(10) Patent No.: US 8,087,229 B2
(45) Date of Patent: *Jan. 3, 2012

(54) VARIABLE SUPERSONIC MACH NUMBER AIR HEATER UTILIZING SUPERSONIC COMBUSTION

(75) Inventors: Kenneth J. Wilson, Ridgecrest, CA (US); Warren K. Jaul, Ridgecrest, CA (US); Robert G. Burman, Ridgecrest, CA (US); Shannon L. Fitzpatrick, Rancho Cordova, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1032 days.

This patent is subject to a terminal disclaimer.

(21) Appl. No.: 11/970,231

(22) Filed: Jan. 7, 2008

(65) Prior Publication Data
US 2010/0281873 A1   Nov. 11, 2010

Related U.S. Application Data

(63) Continuation-in-part of application No. 11/014,377, filed on Dec. 14, 2004, now abandoned, and a continuation-in-part of application No. 11/014,376, filed on Dec. 14, 2004, now Pat. No. 7,296,396, and a continuation-in-part of application No. 10/337,667, filed on Dec. 24, 2002, now Pat. No. 6,948,306.

(51) Int. Cl.
*F02K 1/00* (2006.01)
*F02K 1/28* (2006.01)

(52) U.S. Cl. ......................... 60/231; 239/265.17; 60/761

(58) Field of Classification Search ............... 60/200.1, 60/211, 231, 764, 761, 257, 258, 260, 752; 239/265.17

See application file for complete search history.

(56) References Cited

U.S. PATENT DOCUMENTS

| | | | | |
|---|---|---|---|---|
| 2,943,821 A | * | 7/1960 | Wetherbee, Jr. | 244/52 |
| 3,040,516 A | * | 6/1962 | Brees | 60/208 |
| 3,668,872 A | * | 6/1972 | Camp et al. | 60/207 |
| 3,690,102 A | * | 9/1972 | Du Pont et al. | 60/269 |
| 3,698,642 A | * | 10/1972 | McCullough | 239/265.23 |
| 3,759,039 A | * | 9/1973 | Williams | 60/231 |
| 3,956,885 A | * | 5/1976 | Davis et al. | 60/39.462 |

(Continued)

OTHER PUBLICATIONS

H.W. Liepmann et al., Elements of Gas Dynamics, 1957, John Wiley and Sons, Inc., pp. 124-143.*

*Primary Examiner* — William H Rodriguez
(74) *Attorney, Agent, or Firm* — Robert R. Lerma; Christopher L. Blackburn

(57) ABSTRACT

A supersonic combustion apparatus including a fixed geometric nozzle having a converging area, throat, and a diverging area, at least one movable combination of a fuel injector and an oxygen injector where the combined fuel injector and the oxygen injector is located within the divergent area of the fixed geometric nozzle, and an exit plane adjacent and downstream to the diverging area. The exit plane Mach speed is varied by heat addition in the diverging area by introduction of a combustible fuel through the fuel injector and oxygen through the oxygen injector and then axially aligning and positioning the combination of the fuel injector and the oxygen injector along the length of the diverging area to obtain a stabilized flame at the exit plane.

12 Claims, 5 Drawing Sheets

U.S. PATENT DOCUMENTS

| | | | | |
|---|---|---|---|---|
| 4,010,608 A * | 3/1977 | Simmons | | 60/226.3 |
| 4,644,746 A * | 2/1987 | Hartman | | 60/269 |
| 5,054,288 A * | 10/1991 | Salemann | | 60/244 |
| 5,283,985 A * | 2/1994 | Browning | | 451/38 |
| 5,341,640 A * | 8/1994 | Faulkner | | 60/251 |
| 5,419,117 A * | 5/1995 | Greene | | 60/224 |
| 5,694,768 A * | 12/1997 | Johnson et al. | | 60/226.3 |
| 5,706,650 A * | 1/1998 | Thayer | | 60/231 |
| 5,946,904 A * | 9/1999 | Boehnlein et al. | | 60/269 |
| 6,510,683 B1 * | 1/2003 | Lawlor | | 60/39.35 |
| 6,568,171 B2 * | 5/2003 | Bulman | | 60/224 |
| 6,666,016 B2 * | 12/2003 | Papamoschou | | 60/226.1 |
| 6,857,261 B2 * | 2/2005 | Wilson et al. | | 60/204 |
| 6,948,306 B1 * | 9/2005 | Wilson et al. | | 60/204 |
| 7,076,952 B1 * | 7/2006 | Vetrovec | | 60/605.1 |
| 7,296,396 B1 * | 11/2007 | Wilson et al. | | 60/211 |

* cited by examiner

US 8,087,229 B2

VARIABLE SUPERSONIC MACH NUMBER AIR HEATER UTILIZING SUPERSONIC COMBUSTION

CROSS-REFERENCE TO RELATED APPLICATIONS

This is a continuation-in-part application, claiming the benefit of, parent application Ser. No. 10/337,667 filed on Dec. 24, 2002 (U.S. Pat. No. 6,948,306 —expired due to non-payment of maintenance fees) and claiming the benefit of continuation in-part application Ser. No. 11/014,377 filed on Dec. 14, 2004 (Expressly Abandoned), and continuation in-part application Ser. No. 11/014,376 (U.S. Pat. No. 7,296, 396), filed Dec. 14, 2004 whereby the entire disclosures of which are incorporated by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

This invention relates to a supersonic combustion apparatus and method of using the same for hypersonic materials and propulsion testing, and more specifically, a supersonic heater including a plurality of multiple injection means for varying exit plane Mach numbers.

BACKGROUND OF THE INVENTION

Missiles that can fly at hypersonic speeds for many minutes have a future Naval need to increase standoff distances and reduce the time to impact on time critical targets. To be feasible these missiles must use air breathing propulsion systems that depend upon both subsonic and supersonic combustion to produce thrust for part of their flight. It is further envisioned that future missile systems will be required to fly at speeds that cover a wide range of Mach numbers. For example a single vehicle's speed might vary from Mach 3-5, Mach 4-7, or Mach 4-8 during a single flight. Mach is the ratio of a vehicle's speed to the speed of sound in the fluid at the local conditions of pressure and temperature. The speed of sound in air, in the atmosphere at sea level, is generally about 1,225 kilometers per hour (1117 ft/sec). A vehicle flying at this speed is said to be flying at Mach 1. Twice this speed is Mach 2 and so on.

Supersonic flight is deemed to be anything between Mach 1 and about Mach 4, or four times the speed of sound. Hypersonic speeds lie above that. The fastest currently existing manned air-breathing jet, known as the SR-71 Blackbird, flies at about Mach 3.6. Hyper-X also known as the X-43 recently flew at almost 10 times the speed of sound, or Mach 10. Speeds over Mach 5 are commonly termed hypersonic. (The Aviation History On-line Museum & GE Aircraft Engines). To achieve such a wide range of flight Mach numbers future vehicles will be required to use both subsonic and supersonic combustion to produce thrust. Turbine based engines can be used to fly from 0 up to approximately Mach 4. A ramjet that has been boosted to around Mach 2.3 can be used to fly up to approximately Mach 5. To attain speeds above Mach 5 future vehicle will probably have to rely on scramjet propulsion. A ramjet engine construct operates by subsonic combustion of fuel in a stream of air compressed by the forward speed of the aircraft itself, as opposed to a normal jet engine, in which the compressor section (the fan blades) compresses the air. Ramjets operate from about Mach 2.3 to Mach 5.

U.S. patent application Ser. No. 10/337,667 filed on Dec. 24, 2002, illustrates the following on scramjet engines. Scramjet is an acronym for Supersonic Combustion Ramjet. The scramjet differs from the ramjet in that combustion takes place at supersonic air velocities through the engine. It is mechanically simple having a burner (2), but vastly more complex aerodynamically than a jet engine. Hydrogen is the ideal fuel used, however other fuels such as hydrocarbons can be used. A ramjet has no moving parts and achieves compression of intake air by the forward speed of the air vehicle. Air entering the intake of a supersonic aircraft is slowed to subsonic velocities and compressed by aerodynamic diffusion created by the inlet and diffuser (1) to velocities and pressures comparable to those in a turbojet augmentor. After fuel injection and combustion the hot gases are accelerated through a nozzle to generate push (thrust).

A scramjet engine construct (supersonic-combustion ramjet) is a ramjet engine in which combustion of fuel in the engine takes place at supersonic velocities. The scramjet has an inlet (1), burner (2), and nozzle (3). Scramjet technology is challenging because only limited testing can be performed in ground facilities. A scramjet works by taking in air at speeds greater than Mach 5, slowing the air velocity to lower supersonic speeds and using it to combust a fuel, accelerating the products of combustion in a supersonic nozzle which in turn creates thrust. Hypersonic missiles will have to utilize both ramjet and scramjet technologies and constructs during a single flight to reach both high speeds and long-range capabilities. In addition transition between the different modes of combustion will be required. Ground test facilities will be required that can simulate variable Mach number air flows to test these future vehicles. Ground test facilities typically depend upon combustion heated air accelerated through a high-speed free jet nozzle to simulate flight like conditions. The ability to vary the free jet Mach number by 1 or 2 Mach numbers during a single test does not currently exist for these high temperature (>1200K) flows. The ability to vary the Mach number during a test is the application for the device described herein. Due to a wide range of flight conditions encountered by these engines during operation, the air mass flow varies considerably while the missile is changing speed and altitude. Changing Mach number and angle of attack necessitate changes in fuel burn rate to maintain the variable fuel consumption within acceptable limits.

Combustion instability has been a problem of major concern. Unstable, periodic fluctuation of combustion chamber pressure that has been encountered in ramburners arises from several causes associated with combustion mechanism, aerodynamic conditions, real or apparent shifts in fuel-to-air ratio or heat release, and acoustic resonance. The periodic shedding of vortices produced in highly sheared gas flows has been recognized as a source of substantial acoustic energy for many years. For example, experimental studies have demonstrated that vortex shedding from gas flow restrictors disposed in large, segmented, solid propellant rocket motors couples with the combustion chamber acoustics to generate substantial acoustic pressures. The maximum acoustic energies are produced when the vortex shedding frequency matches one of the acoustic resonances of the combustor. It has been demonstrated that locating the restrictors near a velocity antinode generated the maximum acoustic pressures in a solid propellant rocket motor, with a highly sheared flow occurring at the grain transition boundary in boost/sustain type tactical solid propellant rocket motors.

An apparatus and method for controlling pressure oscillations caused by vortex shedding is disclosed in U.S. Pat. No. 4,760,695 issued to Brown, et al. on Aug. 2, 1988. The '695 patent discloses an apparatus and method for controlling pressure oscillations caused by vortex shedding. Vortex shedding can lead to excessive thrust oscillations and motor vibrations, having a detrimental effect on performance. This is achieved by restricting the grain transition boundary or combustor inlet at the sudden expansion geometry, such that the gas flow separates upstream and produces a vena contracta downstream of the restriction, which combine to preclude the formation of acoustic pressure instabilities in the flowing gas stream. Such an inlet restriction also inhibits the feedback of acoustic pressure to the point of upstream gas flow separation, thereby preventing the formation of organized oscillations. The '695 patent does not present a method or apparatus, which attempts to permit a significant portion of the required enthalpy proportioned to the expansion side of the nozzle via supersonic combustion without the use of expensive film cooled nozzles. Furthermore, the '695 patent does not utilize an oxygen injection means for maintaining flame stability.

Creating long-duration hypersonic flight simulation conditions in a ground test facility can lead to material problems in the facility hardware. The conventional approach to creating these high Mach, high enthalpy flows for testing engine propulsion systems is to expand very high temperature combustion products through a converging-diverging nozzle to the desired pressure, temperature, and Mach number. However, the high total temperature and pressure required for testing may exceed the material capabilities especially at the throat of the nozzle in the ground test facility. As a result, the conventional high temperature subsonic combustion and nozzle expansion approach requires the use of complex and expensive film cooled nozzles (estimated to cost between $1-2 million) for 100 lbm/sec flow rates to survive the high enthalpy flow conditions for the relatively long test times required by the use of such a device. U.S. patent application Ser. No. 10/337,667 filed on Dec. 24, 2002, illustrates the following and is hereby incorporated by reference. This device used supersonic combustion to generate the high Mach number flows required for testing while overcoming the problems associated with survival of the facility nozzle throat.

Therefore, using the device described in U.S. patent application Ser. No. 10/337,667, the present invention fulfills the need to develop a supersonic combustion heater that can vary the Mach numbers at the exit plane to enable mode transition in future air breathing propulsion systems to be tested. The device described herein accomplishes this variable Mach number by heat addition through a plurality of strategically positioned fuel injections means, enhances kinetics, produces an increased high enthalpy flow source, enhances flame stability, improves mixing between fuel and air, and shortens chemical ignition delay, without the use of expensive film cooled nozzles.

SUMMARY OF THE INVENTION

The present invention is a novel supersonic combustion heater apparatus and method of using the same. A supersonic combustion heater comprising: a means for providing a starting pressure flow, wherein the pressure flow has a starting total pressure defined as $Po_1$, wherein the pressure flow has a starting total temperature defined as $To_1$ which is greater than 0° C.; a fixed geometric nozzle having a converging area, throat, and a diverging area, wherein the throat is located between the converging area and the diverging area, wherein the diverging area is downstream of the throat, wherein the pressure flow at the throat is at Mach 1; at least one fuel injection means and at least one flame stabilization means located in the divergent area, wherein at least one fuel injection means includes a combustible fuel injection means for ignition and for increasing total temperature of the pressure flow in the diverging area, wherein the diverging area has Mach numbers greater than 1; and an exit plane adjacent and downstream to the diverging area, wherein the exit plane has a final total pressure defined as $Po_2$, and a final total temperature defined as $To_2$, wherein the final total temperature is up to about 10,000° C., wherein an initial first fuel injection means and an initial first flame stabilization means is located in the diverging area depending on its dimensions and configurations, the total temperature within the diverging area, and the desired exit plane Mach number, wherein a total pressure ratio $Po_2/Po_1$ of up to about 1 which is measured from the starting total pressure and the final total pressure, and the Mach numbers produced at the exit plane, wherein the exit plane Mach is varied by heat addition in said diverging area by at least one fuel injection means and at least one stabilization means, wherein at the exit plane variable supersonic Mach numbers range from between about 1.5 to about 8.

It is to be understood that the foregoing general description and the following detailed description are exemplary and explanatory only and are not to be viewed as being restrictive of the present invention, as claimed. These and other objects, features and advantages of the present invention will become apparent after a review of the following detailed description of the disclosed embodiments and the appended claims.

BRIEF DESCRIPTION OF THE DRAWINGS

Other objects, advantages, and novel features of the present invention will be apparent from the following detailed description when considered with the accompanying drawings.

DETAILED DESCRIPTION OF THE INVENTION

Figure 1:
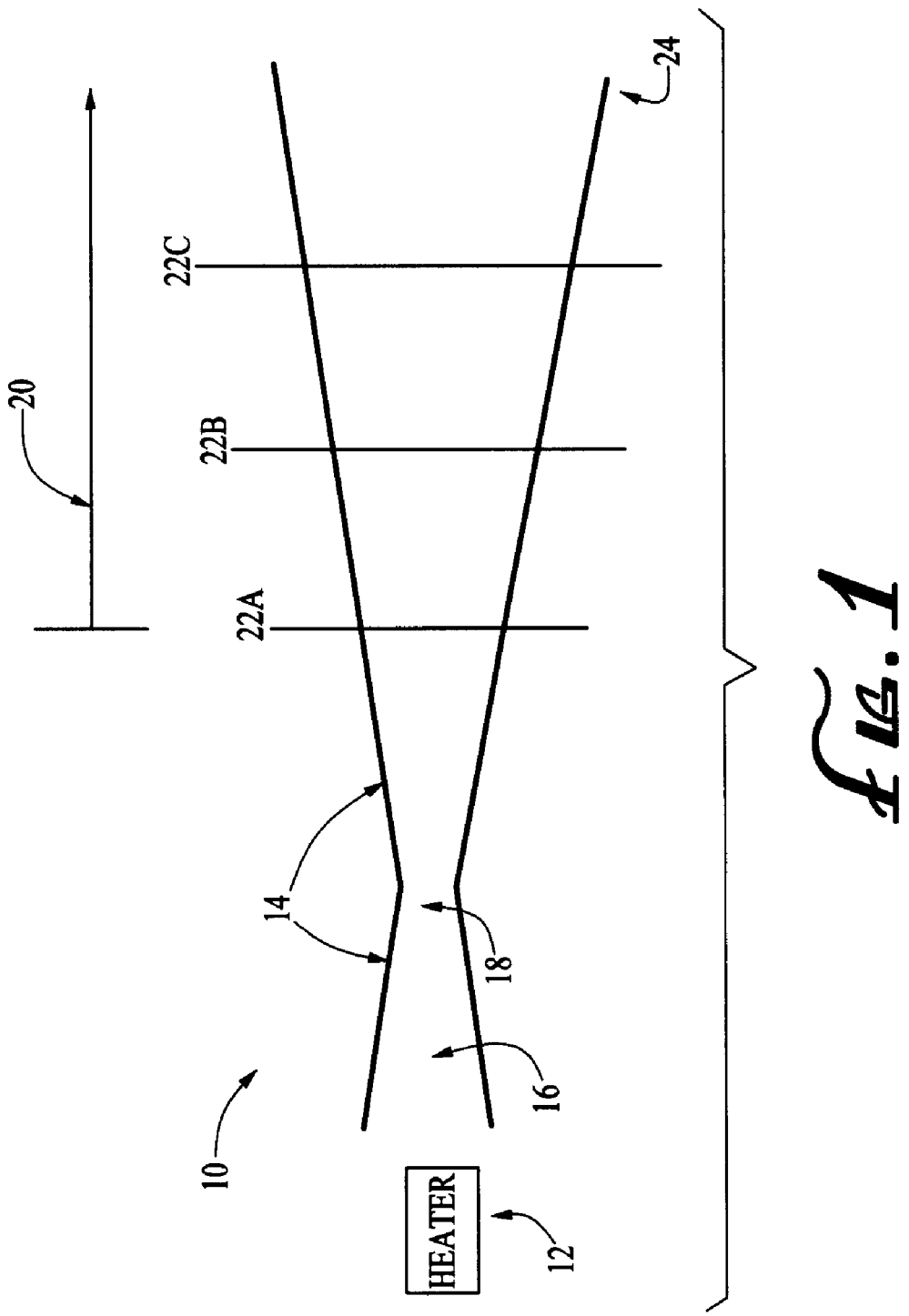
FIG. 1 is a schematic that illustrates a simplified embodiment of the locations within the device used to define the area ratios associated with the heat addition zone, throat and exit plane, and the total temperatures and total pressures at those locations.
Figure 2:
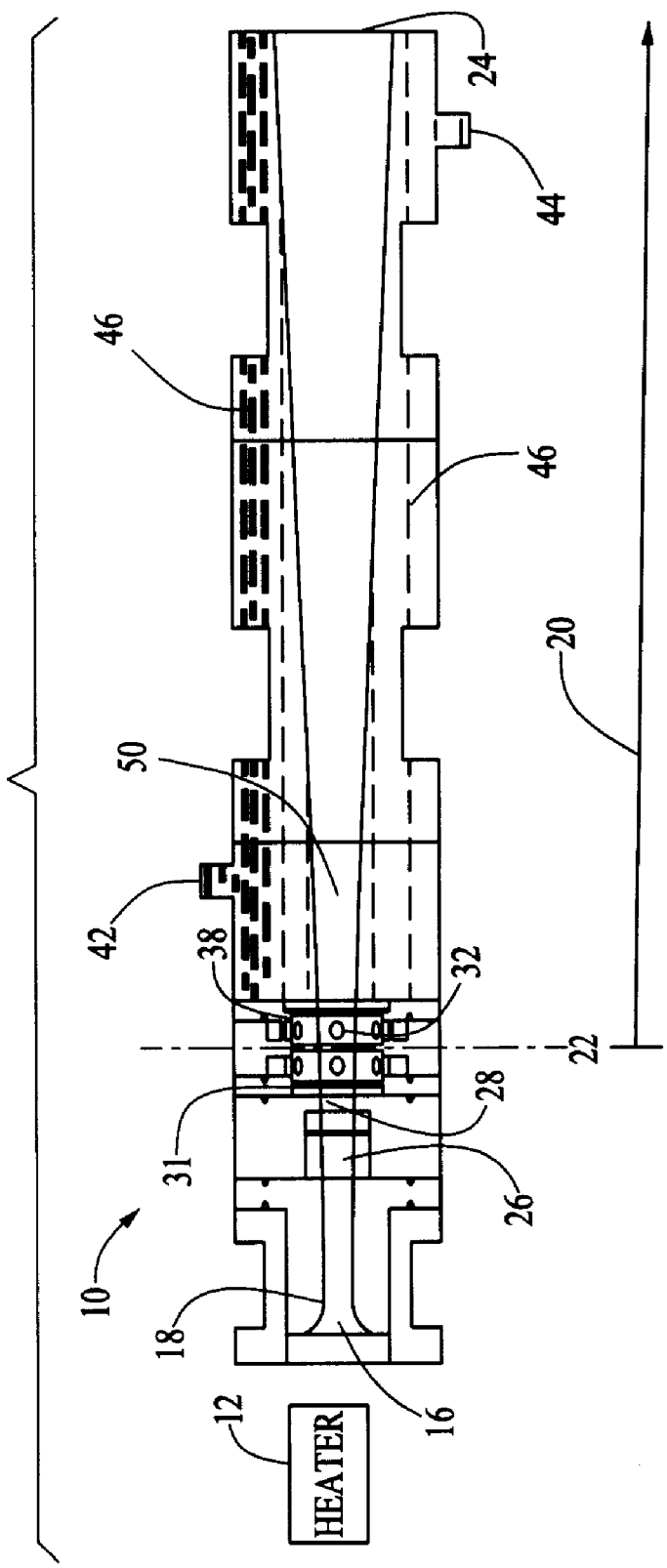
FIG. 2 is a cross-sectional view of an embodiment of the present invention showing the supersonic combustion heater including a nozzle and a throat, a side wall cavity, at least one fuel injection means, at least one stabilization means, a diverging area, and an exit plane, where the duct flow is left to right according to the present invention.

The present invention is a supersonic combustion heater apparatus. FIG. 1 illustrates the supersonic combustion heater 10 and is only one embodiment of the present invention. Referring to FIG. 2, the flame stabilizer unit consists of a fuel injector 31 followed in close proximity by an oxygen injector

38. As depicted in FIG. 2, fuel injector 31 and oxygen injector 38 are identical in structure with each structure having a plurality of injector jets 32. The difference in operation between the two structures is the material expelled from the respective injector jets 32, combustible fuel for the fuel injector 31 and oxygen for the oxygen injector 38. The flame stabilizer unit has a centerline reference point 22 (FIG. 2). The centerline reference point 22 bisects the flame stabilizer unit and is used as a reference point when axially positioning the flame stabilizer unit within the diverging area 50 of the supersonic combustion heater 10. In combination, a flame stabilizer unit and its axial position in the diverging area 50 along length 20 defines the flame stabilization structure. The act of physically positioning the flame stabilizer unit in relation to a given mixture of fuel and oxygen results in a stabilized flame at the exit plane.

Referring to FIG. 1, a first embodiment of the invention uses a first position 22A for placement of the flame stabilizer unit centerline reference point (FIG. 2 item 22) corresponding to a first fuel and oxygen mixture which results in a stabilized flame for the first fuel and oxygen mixture. A second embodiment of the invention uses a second position 22B for placement of the flame stabilizer unit centerline reference point (FIG. 2 item 22) corresponding to a second fuel and oxygen mixture which results in a stabilized flame for the second fuel and oxygen mixture. A third embodiment of the invention uses a third position 22C for placement of a flame stabilizer unit centerline reference point (FIG. 2 item 22) corresponding to yet a third fuel and oxygen mixture which results in a stabilized flame for the third fuel and oxygen mixture. The actual placement of the flame stabilizer unit may vary from the positions depicted in FIG. 1 (items 22A, 22B and 22C) due to variations in the ratio of the injected fuel to the injected oxygen.

The supersonic combustion heater apparatus 10 comprising, a means 12 for providing a starting pressure flow, wherein the pressure flow has a starting total pressure defined as $Po_1$, wherein the pressure flow has a starting total temperature defined as $To_1$ which is greater than 0° C.; a fixed geometric nozzle 14 having a converging area 16, throat 18, and a diverging area 50, wherein the throat 18 is located between the converging area 16 and the diverging area 50, wherein the diverging area 50 is downstream of the throat 18, wherein the pressure flow at the throat 18 is at Mach 1; at least one flame stabilizer unit is located in the divergent area 50, wherein at least one flame stabilizer unit is used for ignition and for increasing total temperature of the pressure flow in the diverging area 50, wherein the diverging area 50 has Mach speeds greater than 1; and an exit plane 24 adjacent and downstream to the diverging area 50, wherein the exit plane 24 has a final total pressure defined as $Po_2$, and a final total temperature defined as $To_2$, wherein the final total temperature is up to about 10,000° C., wherein a first flame stabilizer unit is located in the diverging area 50 depending on its dimensions and configurations, the total temperature within the diverging area 50, and the desired exit plane 24 Mach speed, wherein a total pressure ratio $Po_2/Po_1$ of up to about 1 which is measured from the starting total pressure and the final total pressure, and the Mach numbers produced at the exit plane 24, wherein the exit plane 24 Mach is varied by heat addition in the diverging area 50 by at least one flame stabilizer unit, wherein at the exit plane 24 variable supersonic Mach numbers range from between about 1.5 to about 8.

In another embodiment, the supersonic combustion air heater apparatus 10 further comprises an air heater 12 upstream of the nozzle 14 to provide heated pressure flow. In this embodiment, the starting pressure flow is heated ranging from total temperature of about 30° C. to about 1650° C. having starting total pressures ranging from about 30 psia to about 20,000 psia. In other embodiments, the starting pressure flow is heated ranging from total temperature of about 100° C. to about 1100° C. having starting total pressures ranging from about 200 psia to about 3,000 psia. Either an upstream vitiator or an air heater 12 provides heated high-pressure flow that is expanded through the nozzle 14 which accelerates flow to supersonic velocities.

The supersonic combustion apparatus 10 shown in FIG. 2, further comprises at least one acoustic cavity 26 located adjacent and downstream of the throat and having a downstream lip 28 to cause shedding of periodic coherent vortices downstream. Cavity 26 enhanced active/passive mixing technology along with the ground based luxury of oxygen injection and added combustor length and weight of the present supersonic combustion heater 10 is ideal for hypersonic material and engine testing. The construction of the present invention 10 is based on a side wall cavity 26 in the supersonic flow duct that is constructed for a desired acoustic resonance.

A boundary layer flow in the supersonic flow duct flaps over this cavity 26 and periodically impinges on its downstream lip 28, which causes shedding of periodic coherent vortices downstream. In this embodiment, the injection of a desired combustible fuel is just downstream of this vortex shedding point and the fuel is entrained into the supersonic vortex and rapidly mixes with the flow. This rapid mixing and the flame holding characteristics of the cavity 26 are critical to maintaining supersonic combustion. Furthermore, present invention 10 is related to utilizing flow vortices for controlling heat transfer.

This embodiment of the present invention 10 makes use of resonant acoustic cavity driven coherent vorticity to enhance mixing in the supersonic combustion zone and enable heat addition in the diverging area 50 in the pressure flow. In an embodiment, the side wall cavity 26 includes, but is not limited to a length to depth ratio of about four to one is positioned just upstream of the flame stabilizer unit. Other embodiments of the present invention 10 include a make-up oxygen injection means localized to enhance flame stability.

The materials that are used to construct the converging and diverging sections of the nozzle and throat of this device must be chosen to handle the expected heat flux and pressures. Materials include, but are not limited to Incoloy 909, Haynes 230, Inconel 718, Monel 400, Nickel 201, Titanium-Zirconium-Molybdenum (TZM) 17-4ph steel, Copper-Beryllium, Copper-Zirconium and others. Components made from these materials may require a ceramic coating to further guarantee survival. It is expected that backside cooling using air, water or other liquids and gases will be required. FIG. 2 shows an example of water cooling the diverging section of the nozzle. Water inlet 42 allows cooling water 46 to flow through the area surrounding the backside portion of the diverging section portion of the nozzle having a length 20. Water outlet 44 allows cooling water 46 to exit the diverging section of the nozzle completing the cooling water circulation path.

It may also be necessary to introduce a film cooling gas along the hot gas surface of the nozzle to reduce material temperatures or temperature gradients. Additional flame stabilizer units are located throughout the diverging area 50 downstream of the flame stabilizer unit within the diverging area 50 to produce variable Mach numbers ranging from about 1.5 to about 8. The combustible fuel comprises at least one of hydrogen and hydrocarbons or the like, or any combination thereof. In other embodiments the combustible fuel is hydrogen.

Combustion gases flowing through a rocket nozzle are subjected to the combined effects of area change and heat addition. The properties of the gas are affected by these two conditions. Equations below describe the state of the flow of a frictionless one-dimensional flow of an ideal gas. Differential forms of the one-dimensional ideal gas continuity, momentum, and equation of state along with the definition of Mach number when density and velocity are eliminated leads to the single differential equation shown in Equation 1. Employing the standard isentropic flow relation between stagnation (total) temperature ($T_0$), static temperature (T), and Mach number (M). Equation 1 is re-expressed in terms of $T_0$ as Equation 2. A useful simplification of Equation 2 leading to closed form solutions across the region where heat is added (through combustion) is to assume that combustion takes place at a constant Mach number, i.e., the burn is a constant Mach number burn. Applying this assumption Equation 2 simplifies to Equation 3. Since the Mach number (M) is assumed constant, a closed form expression can be derived from the differential relation in Equation 3 relating area ratio and stagnation temperature ratio, resulting in Equation 4. In Equation 4 the subscript 1 refers to the beginning of the burn region and the subscript 2 denotes the end of the burn region. Also, a relation for stagnation pressure ratio across the burn region can be derived from the constant burn-Mach number assumption; the resulting expression is shown in Equation 5. Equation 5 in conjunction with standard isentropic flow relations in the pre-burn and post-burn regions of the nozzle flow can be used to provide an estimate of the one-dimensional behavior and performance of the variable-area-heat-addition control of exit (test) Mach number.

$$-\frac{dA}{A} + (\gamma M^2 - 1)\frac{dM}{M} + \frac{\gamma M^2 + 1}{2}\frac{dT}{T} = 0 \quad \text{Equation 1}$$

$$\frac{dM}{M} = \frac{1 + \frac{\gamma-1}{2}M^2}{M^2 - 1}\frac{dA}{A} - \frac{(\gamma M^2 + 1)\left(1 + \frac{\gamma-1}{2}M^2\right)}{2(M^2-1)}\frac{dT_0}{T_0} \quad \text{Equation 2}$$

$$\frac{dA}{A} = \frac{\gamma M^2 + 1}{2}\frac{dT_0}{T_0} \quad \text{Equation 3}$$

$$\frac{A_2}{A_1} = \exp\left(\frac{\gamma M^2 + 1}{2}\ln\left(\frac{T_{0_2}}{T_{0_1}}\right)\right) \quad \text{Equation 4}$$

$$\frac{P_{0_2}}{P_{0_1}} = \exp\left(-\frac{\gamma}{2}M^2\ln\left(\frac{T_{0_2}}{T_{0_1}}\right)\right) \quad \text{Equation 5}$$

Flame stabilization is controlled by either geometrical changes within the device or by a flow induced means. Geometric techniques include cavities that create a sidewall depression, steps that protrude into the flow, and alterations including ramps that cause a reduction in flow velocity or recirculation zones. Any disturbance in a supersonic flow can create an oblique or bow shock that induces discontinuities of pressure and temperature that can act as a point of ignition. Also, certain flow induced injection techniques utilizing a fuel, oxidizer, or combination thereof, can cause an intense initial reaction that will stabilize the flame.

In embodiments of the present invention, the exit plane 24 is dimensioned and configured to withstand final total temperatures ranging from about 100° C. to about 5000° C., total pressures ranging from about 200 psia to about 2000 psia, and pressure flows having variable Mach numbers ranging from about 2 to about 6. In other embodiments, the exit plane 24 is dimensioned and configured to withstand final total temperatures ranging from about 100° C. to about 5000° C., total pressures ranging from about 200 psia to about 4000 psia, and pressure flows having variable Mach numbers ranging from about 2 to about 6. The exit plane 24 produces variable supersonic Mach speeds ranges comprising at least one of about 2.6 to about 2.93, about 2 to about 3, about 5.5 to about 6.5, about 5 to about 6, about 5 to about 7, about 6 to about 8, and about 6 to about 7.

The present invention also includes a method of using a supersonic combustion air heater 10 comprising: providing a starting pressure flow which is expanded through a throat, the pressure flow having a starting total temperature $To_1$ and a starting total pressure $Po_1$, wherein said total temperature is greater than 0° C.; providing a fixed geometry nozzle having a throat, converging area, and diverging area, wherein the throat is located between the converging area and the diverging area, wherein the diverging area is located downstream of the throat, wherein the throat withstands the pressure flow at Mach 1; providing at least one fuel injection means and at least one flame stabilization means located in the divergent area, wherein the fuel injection means includes a combustible fuel injection means for ignition and for increasing total temperature of the pressure flow in the diverging area, wherein the diverging area having Mach numbers greater than 1; and providing an exit plane adjacent and downstream to the diverging area, wherein the exit plane having a final total pressure $Po_2$, and a final total temperature defined as $To_2$, wherein the final total temperature is up to about 10,000° C., wherein a first injection fuel means and a first flame stabilization means is located in the diverging area depending on the dimensions and configurations of the diverging area, the total temperature within the diverging area, and the desired exit plane Mach numbers, wherein a total pressure ratio $Po_2/Po_1$ of up to about 1 which is measured from the starting total pressure and the final total pressure, and the Mach numbers produced at the exit plane, wherein the exit plane Mach is varied by heat addition in the diverging area by at least one fuel injection means and at least one stabilization means, wherein at the exit plane variable supersonic Mach numbers range from between about 1.5 to about 8.

Experimental Results

The following experiments are exemplary and explanatory only and are not to be viewed as being restrictive of the present invention, as claimed.

Figure 3:
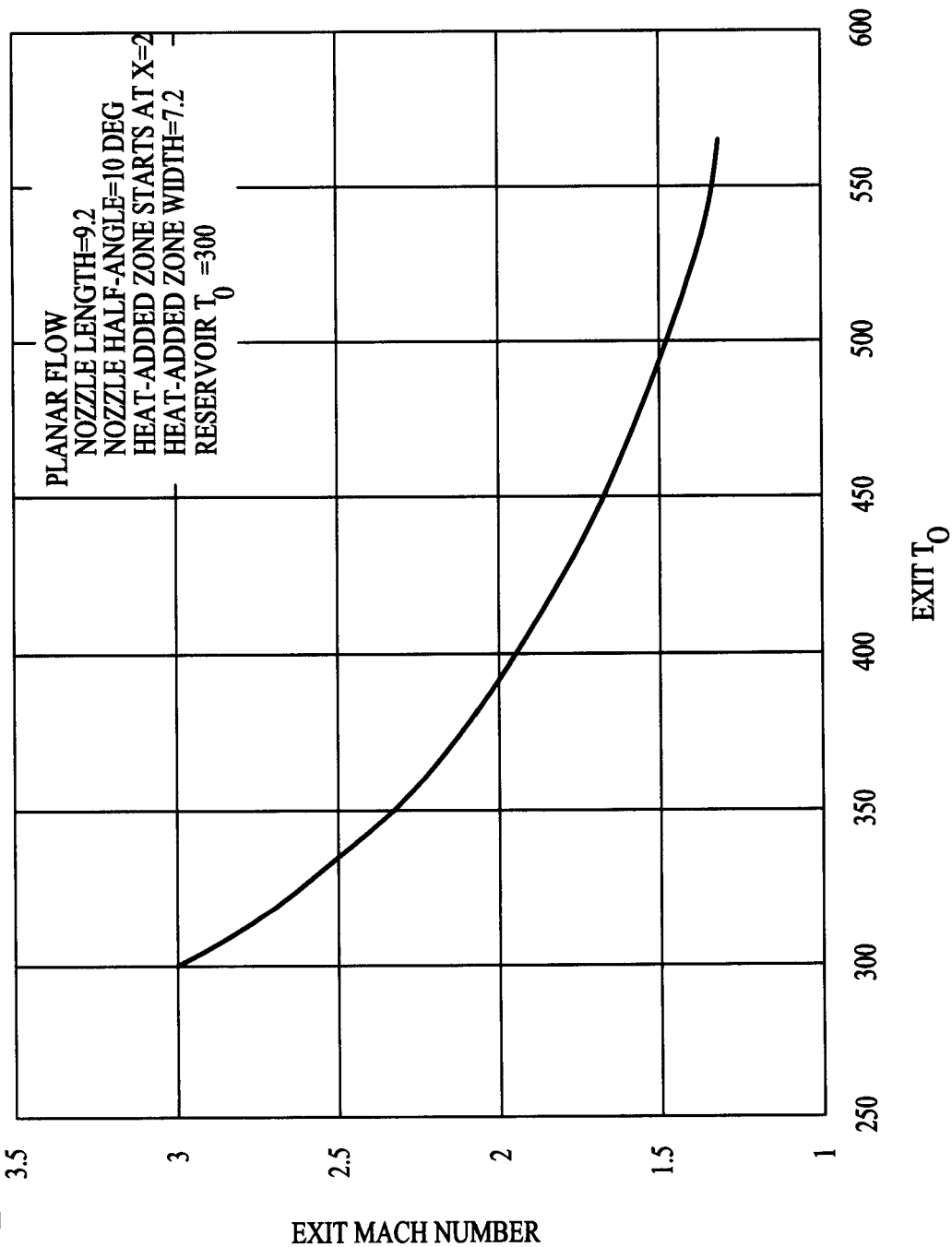
FIG. 3 is a graph that illustrates the prediction of the variation of exit Mach number as the amount of heat added (final total temperature) is changed according to the present invention.

FIG. 3 illustrates the results of a one dimensional analysis which concludes that the exit Mach number can be varied by adding varying amounts of heat, or fuel (in effect, varying the equivalence ratio) over a specified region in the diverging section. Different exit Mach numbers were obtained in the analysis when different amounts of heat were added at the same initial Mach number location. The analysis also concluded that it is critical to add the heat in as low of a Mach number region as possible, so as to reduce the loss of total pressure (the ratio Po2/Po1 is as close to 1 as possible). A specific example of these results includes the following.

In Case A, in Table 1, beginning with a total temperature ($To_1$) of 1300 K, the total temperature was raised by 800 K over length x, starting at a region with a Mach number of 1.5 ($Mach_{burn}$), resulting in a total temperature ($TO_2$) of 2100 K. This resulted in an exit Mach number of 8 ($M_{exit}$) with a total pressure ratio $Po_2/Po_1$ equal to 0.47. Here, A1/Ath is the ratio of area at the start of the heat addition, which is coincident with centerline reference point 22, which is movable as seen in FIG. 1 (items 22A, 22B, 22C) moving to a position that is a function of a fuel oxygen mixture, to the area of the throat 18, A2/Ath is the ratio of area at the end of heat addition, where the area at the end of heat addition is determined by the flame stabilization point within diverging area 50 to the area of the throat 18, and A3/Ath is the ratio of the area at the exit plane 24 to the area of the throat 18. In Case B, in Table 1, beginning with the same initial total temperature of 1300K and raising it again by 800K, but this time adding the heat starting at a Mach number of 2.0, results in a final total pressure ratio $Po_2/Po_1$ equal to 0.26. Thus adding the same amount of heat, but at the lower Mach number results in much less loss of total pressure.

Table 1 also provides an example of a one-dimensional analysis that was conducted to determine the relative scale a system would need to be in terms of exit area ratio to achieve a Mach number of about 8 at the exit plane. The analysis shows two scenarios in which the exit plane to throat area ratio would be as large as 925.37 or as small as 514.25, depending on whether the heat addition began at an area ratio of 1.6875 (Mach number of 2.0) or 1.176 (Mach number of 1.5), respectively.

The two cases presented in Table 2 provide an example of two conditions that might occur in an actual test. Case A in Table 2 starts with an initial total temperature of 1300 K and raising the total temperature by 800 K, the final Mach number is 6.5. In case B the initial total temperature is 690 K, the total temperature was increased by 880 K starting at a region with a Mach number of 1.5, as in Case A. This resulted in an exit Mach number of 5.5 with a total pressure ratio $Po_2/Po_1$ equal to 0.27.

In an actual test of an air-breathing engine requiring variable Mach number operation from 5.5 to 6.5 the device would operate continuously over the range of final Mach number from 5.5 to 6.5 The total temperature and total pressure of the initial pressure flow would be changing as well as the amount of heat added. The starting position for heat addition would remain the same. As can be seen the very highest total temperatures are only in the supersonic (diverging) section of the nozzle.

TABLE 1

Shows the effect of changing where heat is added to achieve a exit Mach number of 8.

| $To_1$ | $TO_2$ | $Mach_{burn}$ | $M_{exit}$ | $A1/A_{th}$ | $A2/A_{th}$ | $A3/A_{th}$ | $PO_2/PO_1$ |
|---|---|---|---|---|---|---|---|
| 1300 | 2100 | 1.5 | 8.0 | 1.176 | 3.1816 | 514.25 | 0.47 |
| 1300 | 2100 | 2.0 | 8.0 | 1.6875 | 8.214 | 925.37 | 0.26 |

TABLE 2

Demonstration of how the variation of Mach number from 5.5 to 6.5 would be achieved

| $To_1$ | $TO_2$ | $Mach_{burn}$ | $M_{exit}$ | $A1/A_{th}$ | $A2/A_{th}$ | $A3/A_{th}$ | $PO_2/PO_1$ |
|---|---|---|---|---|---|---|---|
| 1300 | 2100 | 1.5 | 6.5 | 1.176 | 3.1816 | 203.24 | 0.47 |
| 690 | 1570 | 1.5 | 5.5 | 1.176 | 6.477 | 203.02 | 0.27 |

Experiments at the Naval Air Warfare Center (NAWCWD) utilize a hydrogen-fueled supersonic combustion heater to add enthalpy to the flow after it is expanded to a supersonic condition in the diverging section of the nozzle where the flow static temperature and static pressure are relatively low. As a result, high enthalpy flows suitable for hypersonic ground testing can be generated without creating excessive heat transfer at the nozzle throat. Ultimately, this will reduce the cost and increase the reliability of large, high-temperature vitiated air heaters. To date proof-of-concept experiments have been conducted that used the supersonic combustion heater to produce a nominal Mach 3 jet with 2000 K total temperature. This supersonic combustion heater features a unique technology for flame holding in the supersonic air stream (U.S. patent application Ser. No. 10/337,667) that makes the combustion efficient and the combustor scalable from its current flow rate of 1-2 lbm/sec to 100-200 lbm/sec and more.

The ability to vary the exit Mach number has an important application to testing air breathing engine mode transition. Future air breathing hypersonic vehicles will need to rely upon multiple modes of engine operation to operate over their entire flight envelope. For example a missile may begin flight using a turbine-based engine cycle, or mode, to reach Mach 5 and transition to scramjet mode of operation to reach Mach 7 and beyond. The transition between subsonic combustion (in a turbine) and scramjet modes is a critical phase of flight and ground tests of this cycle change will require that a free jet facility be capable of varying the delivered Mach number from Mach 5 to Mach 7, for example. Wider variations of Mach number may be desirable.

Figure 4:
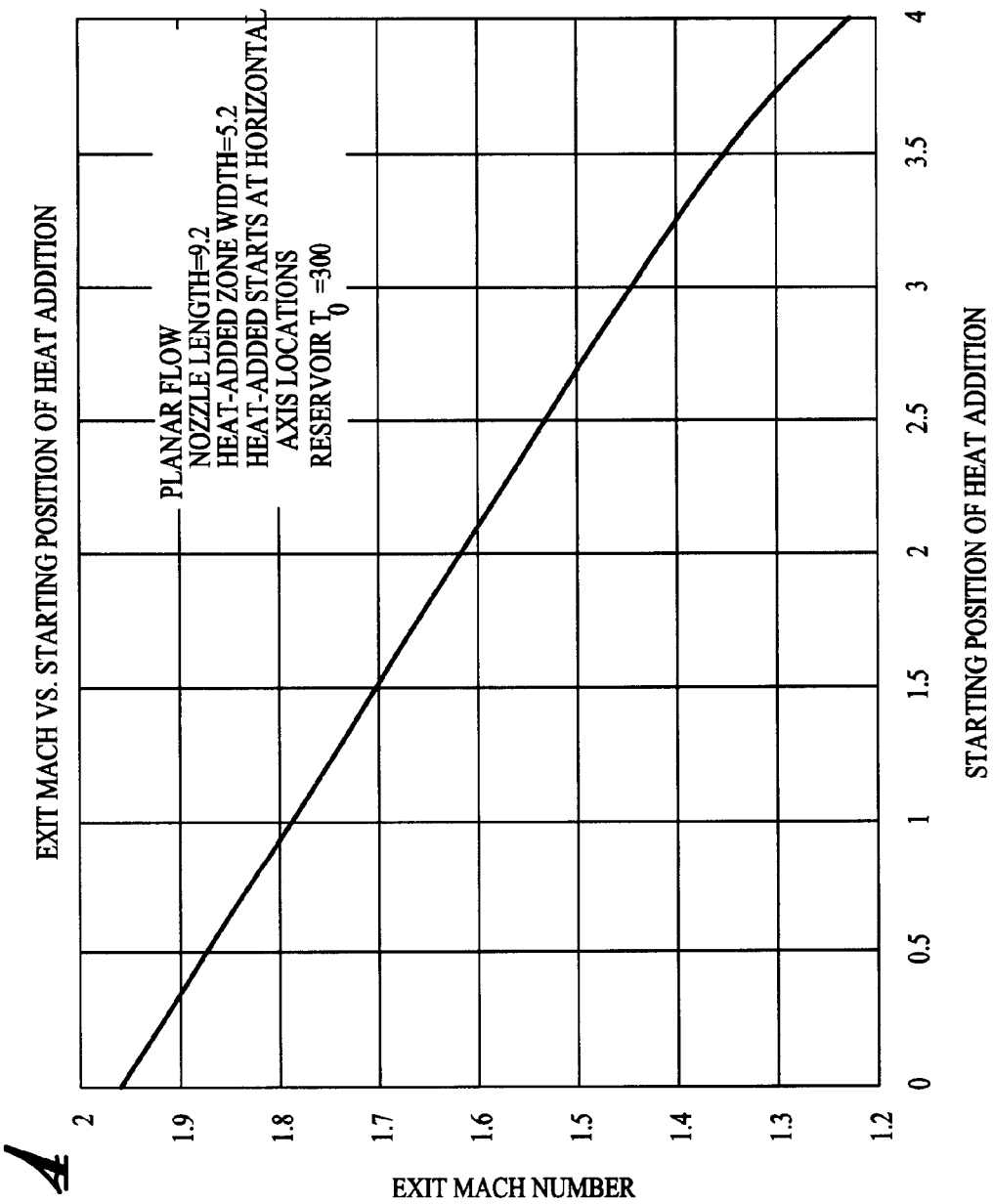
FIG. 4 is a plot that illustrates the predicted effect of varying the starting location of heat addition on final Mach number according to the present invention.
Figure 5:
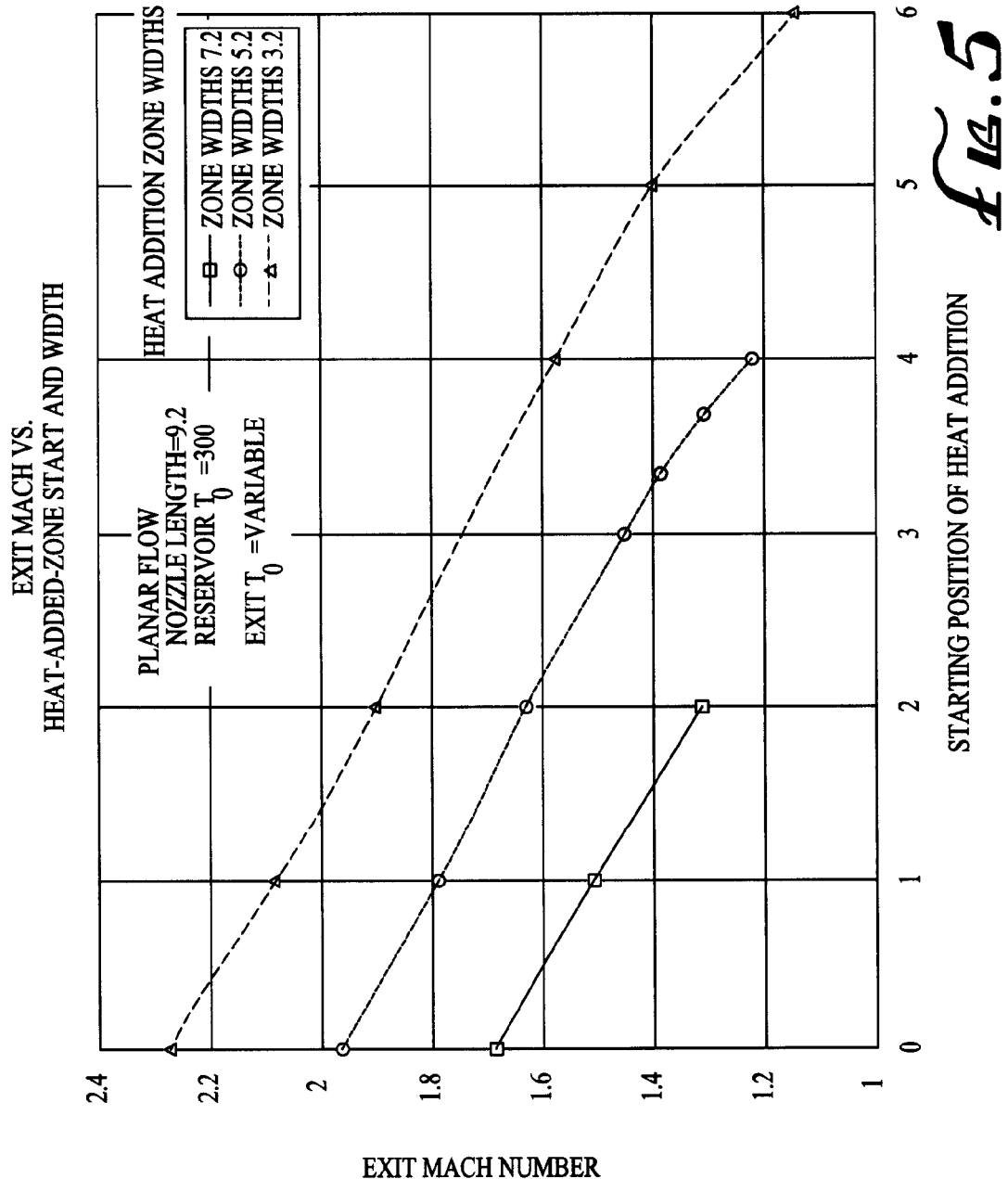
FIG. 5 is a plot that illustrates the predicted effect of varying the starting location and width of heat addition according to the present invention.

The results of a 1-D analysis that demonstrates the potential for Mach number variability using this supersonic combustion air heater are shown in FIGS. 3-5. The analysis assumes a Mach 3 nozzle with total temperature and total pressure of 300 K and 500 psia respectively. By varying the starting location of heat addition, length of heat addition, or amount of heat addition the final Mach number can be varied for a fixed geometry nozzle. The experiments have demonstrated variable Mach number when the fuel-air equivalence ratio is changed from 0.78 to 0.32 in two tests. It was found that the exit Mach number varied from 2.64 to 2.93 for these two different fuel-air equivalence ratios.

Procedure to Vary the Mach Number

Several techniques will be used to obtain the desired final Mach number. The incoming air flow will be heated to some initial total temperature $T_0$ using a conventional subsonic heater prior to entering the supersonic combustor. Using the example given in FIG. 3, left unchanged this air flow would exit the supersonic combustor with a Mach number of 3. As shown in FIG. 4, as fuel is burned in the supersonic combustor raising the total temperature of the flow as an example from 300K to 560K the exit Mach number would decrease from 3 to 1.3. Alternatively, according to FIG. 4, the starting location of heat addition could be varied. Assuming a constant amount of heat addition and therefore a constant final total temperature, as the location for fuel injection and therefore heat addition moves downstream the final Mach number decreases. Thus, the total temperature is constant while the Mach number changes. FIG. 5 gives an example of the case where the length over which heat is added and the initial location is also varied. Various combinations of final total temperature and Mach number are possible using these techniques. Although the examples use a baseline exit plane Mach number of 3 and total temperature of 300K, this system would theoretically work for any combination of Mach number and total temperature. The goal of this effort is to develop a variable Mach number system that would span the range of about Mach 1.5-8 and total temperatures from 1000-6000 R.

Exit Mach number can depend on the heat-added zone placement and axial length within the diverging nozzle and the value of stagnation temperature reached downstream of the heat addition zone. The results of an analysis shown in FIG. 5 demonstrate these effects. The experimental results presented in Table 3 below demonstrate the sensible dependence of the exit Mach number on the amount of heat added to the flow as indicated by the downstream stagnation temperature.

TABLE 3

Illustrates the equivalence ratio versus
exit Mach number achieved during testing.

| Equivalence Ratio Injected During Testing | Exit Mach Number | Air Flow Rate (lbm/s) |
|---|---|---|
| 0.32 | 2.93 | 0.93 |
| 0.54 | 2.63 | 0.95 |
| 0.78 | 2.81 | 0.62 |

It is known that with long-duration hypersonic flight come material problems. The present invention 10 is constructed to test materials, including radomes, flight surfaces, and inlets, at the high enthalpy of hypersonic flight; however, the supersonic combustion heater can be used for other non-related purposes. In addition, air-breathing propulsion systems for hypersonic platforms must be ground tested as well to characterize their performance at hypersonic flight speeds. In both cases high-enthalpy high-speed high-mass rate flow test facilities are required.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A supersonic combustion air heater apparatus comprising:
    a means for providing a starting pressure flow, wherein said pressure flow having a starting total pressure defined as $Po_1$;
    a fixed geometric nozzle having a converging area, throat, and a diverging area, wherein said throat is located between said converging area and said diverging area, wherein said diverging area is downstream of said throat, wherein said pressure flow at said throat is at Mach 1;
    an inlet air heater upstream of said nozzle to heat said starting pressure flow to a starting temperature defined as $To_1$ which is greater than 0° C.;
    a flame stabilization means located in said divergent area, wherein said flame stabilization means includes a combustible fuel injector for ignition and for increasing total temperature of said pressure flow in said diverging area, wherein said diverging area having Mach speeds greater than 1; and
    an exit plane adjacent and downstream to said diverging area, wherein said exit plane having a final total pressure defined as $Po_2$, and a final total temperature defined as $To_2$, wherein said final total temperature is up to about 3000° C., wherein said flame stabilization means is positioned within said diverging area depending on the dimensions of said diverging area, said total temperature within said diverging area, and having a final Mach speed at said exit plane, wherein a total pressure ratio $Po_2/Po_1$ of up to about 1 which is measured from said starting total pressure and said final total pressure, and said final Mach speed produced at said exit plane, wherein said final Mach speed is varied by heat addition in said diverging area by said flame stabilization means, wherein at said exit plane said final Mach speed is supersonic in a range from between about 1.5 to about 3.

2. The apparatus according to claim 1, wherein said starting pressure flow is heated ranging from total temperature of about 30° C. to about 1650° C. having starting total pressures ranging from about 30 psia to about 20,000 psia.

3. The apparatus according to claim 1, wherein said starting pressure flow is heated ranging from total temperature of about 100° C. to about 1100° C. having starting total pressures ranging from about 200 psia to about 3,000 psia.

4. The apparatus according to claim 1, wherein said exit plane withstands said final total temperatures ranging from about 100° C. to about 3000° C., total pressures ranging from about 200 psia to about 2000 psia, and pressure flows having variable Mach numbers ranging from about 2 to about 3.

5. The apparatus according to claim 1, wherein said exit plane withstands said final total temperatures ranging from about 100° C. to about 3000° C., total pressures ranging from about 200 psia to about 4000 psia, and pressure flows having variable Mach numbers ranging from about 2 to about 3.

6. The apparatus according to claim 1, wherein combustible fuel comprises at least one of hydrogen and hydrocarbons or the like, or any combination thereof.

7. The apparatus according to claim 1, wherein said supersonic combustion air heater apparatus further comprises at least one acoustic cavity located adjacent and downstream of said throat, wherein said acoustic cavity includes a downstream lip to cause shedding of periodic coherent vortices downstream.

8. The apparatus according to claim 7, wherein said acoustic cavity having a side wall cavity.

9. The apparatus according to claim 7, wherein said acoustic cavity is dimensioned and configured for desired acoustic resonance to aid in driving coherent vorticity within said boundary layer flow.

10. The apparatus according to claim 1, wherein said exit plane produces variable supersonic Mach speeds ranges comprising at least one of about 2.6 to about 2.93 and about 2 to about 3.

11. The apparatus according to claim 1, wherein said diverging area is surrounded by cooling water.

12. The apparatus according to claim 1, wherein said flame stabilization means accepts an amount of said combustible fuel flow and an amount of an oxygen flow wherein said combustible fuel flow and said amount of said oxygen flow determine a configuration of said flame stabilization means within said diverging area.

* * * * *